(No Model.)
N. R. DEPPE.
SPREADER.
No. 408,088. Patented July 30, 1889.
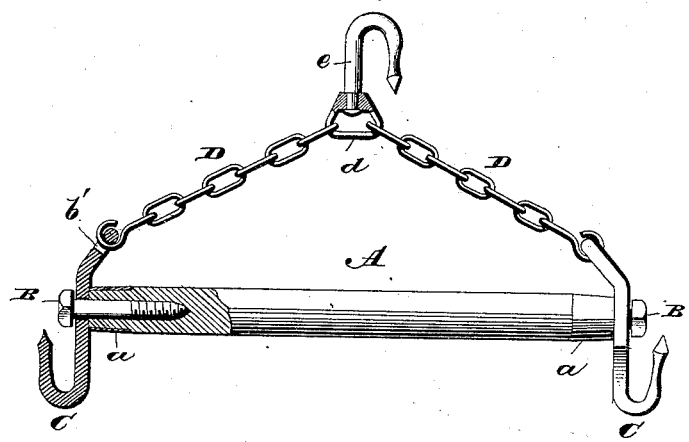
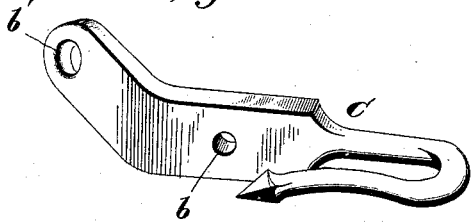
Nelson R. Deppe.
Inventor
Witnesses
G. S. Elliott.
E. W. Johnson.
By his Attorneys

UNITED STATES PATENT OFFICE.

NELSON R. DEPPE, OF CONFLUENCE, PENNSYLVANIA.

SPREADER.

SPECIFICATION forming part of Letters Patent No. 408,088, dated July 30, 1889.

Application filed May 9, 1889. Serial No. 310,184. (No model.)

*To all whom it may concern:*

Be it known that I, NELSON R. DEPPE, a citizen of the United States of America, residing at Confluence, in the county of Somerset and State of Pennsylvania, have invented certain new and useful Improvements in Spreaders; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in whiffletrees or spreaders.

The object of my invention is to provide a spreader the bar of which can be rotated to prevent the hooks secured thereto from becoming twisted, said hooks being provided with perforations through which bolts pass and enter the spreading stick, the rear end of said hook having an eye to which the draft-chain is attached, said draft-chain being connected to a swiveled hook, as will be hereinafter fully set forth and particularly claimed.

In the accompanying drawings, Figure 1 is a plan view, partly in section, of a spreader or whiffletree constructed in accordance with my invention. Fig. 2 is a detail perspective view of one of the hooks attached to the end of the spreader-bar.

A refers to the spreader-bar, which is provided at its ends with ferrules $a\ a$ and recesses for the reception of bolts B B, which secure upon the ends of the bar A the hooks C C. These hooks have their forward ends bent in any shape desired for connecting thereto either the trace-eyes or draft-rings, and centrally these hooks have formed therein perforations $b$, through which pass the headed bolts B, which enter the recesses formed in the ends of the spreader-bar to retain the hooks in position. The rear ends of the hooks, in rear of the spreader-bar, are bent inwardly and provided with eyes $b'$, with which engage the end links of the chains D D. The opposite ends of these chains engage with an eye $d$, to which the shank of the hook $e$ is attached to rotate upon said eye, the hook $e$ being attached to form a swivel-connection.

By the construction hereinbefore described I provide a spreader which is simple, strong, and durable, and which is not liable to become twisted, and in use the bar A can rotate and the hooks C turn upon their securing-bolts, thus permitting the bar to roll upon the ground when it contacts therewith to allow the same to rotate over obstructions.

This spreader is adapted to be used either with or without singletrees, and is especially useful in logging and in such places and for such purposes as the ordinary spreaders consisting of the bar, chains, and hooks are used.

Having thus described my invention, what I claim as new, and desire to secure by Letters Patent, is—

1. The combination, in a whiffletree or spreader, of a round bar A, hooks pivotally attached to the ends thereof, the rear ends of said hooks being bent inwardly and provided with eyes, and chains D D, connected to the eye of a swiveled hook, substantially as shown, and for the purpose set forth.

2. The combination, in a whiffletree or spreader, of a rounded bar A, provided at its ends with ferrules $a$, hooks having perforations $b$, through which pass bolts for securing the hooks to the end of the bar A, the rear ends of said hooks being bent inwardly and provided with eyes $b'$, flexible connections D D; and a hook $e$, connected by a swivel to an eye or link $d$, substantially as shown, and for the purpose set forth.

In testimony whereof I affix my signature in presence of two witnesses.

NELSON R. DEPPE.

Witnesses:
JAMES A. BRADLEY,
AUGUSTUS T. GROFF.